United States Patent
Stevens

(10) Patent No.: US 9,738,245 B1
(45) Date of Patent: Aug. 22, 2017

(54) GAS GENERATOR WITH IMPROVED SUPPORTED BURST CUP

(71) Applicant: Bruce A. Stevens, Oakland, MI (US)

(72) Inventor: Bruce A. Stevens, Oakland, MI (US)

(73) Assignee: TK Holdings Inc., Auburn Hills, MI (US)

( * ) Notice: Subject to any disclaimer, the term of this patent is extended or adjusted under 35 U.S.C. 154(b) by 0 days.

(21) Appl. No.: 15/068,460

(22) Filed: Mar. 11, 2016

Related U.S. Application Data

(60) Provisional application No. 62/131,594, filed on Mar. 11, 2015.

(51) Int. Cl.
*B60R 21/264* (2006.01)
*B60R 21/261* (2011.01)
*B60R 21/26* (2011.01)

(52) U.S. Cl.
CPC .......... *B60R 21/264* (2013.01); *B60R 21/261* (2013.01); *B60R 2021/26029* (2013.01)

(58) Field of Classification Search
CPC ................ B60R 21/264; B60R 21/261; B60R 2021/26029
See application file for complete search history.

(56) References Cited

U.S. PATENT DOCUMENTS

| | | | |
|---|---|---|---|
| 6,009,809 A | 1/2000 | Whang | |
| 7,401,808 B2 | 7/2008 | Rossbach et al. | |
| 7,588,265 B2 * | 9/2009 | Blackburn | B60R 21/268 280/737 |
| 8,113,542 B1 * | 2/2012 | Stevens | B60R 21/274 280/737 |
| 8,186,712 B1 * | 5/2012 | Stevens | B60R 21/274 280/737 |
| 8,459,693 B1 | 6/2013 | Stevens | |
| 2007/0138776 A1 * | 6/2007 | Rossbach | B60R 21/268 280/737 |

* cited by examiner

*Primary Examiner* — Drew J Brown
(74) *Attorney, Agent, or Firm* — Meunier Carlin & Curfman LLC

(57) ABSTRACT

A pressurized gas mechanism contains a sealed gas container containing a sealed first end, and, a burst cup sealing the first end and containing a rupturable portion. A housing encases the burst cup and is juxtaposed to at least a portion of the sealed gas container, the housing containing a surface juxtaposed to the rupturable portion. Upon actuation of the mechanism, the rupturable portion is adapted to rupture as the rupturable portion is leveraged against the surface, thereby releasing gas from the sealed gas container.

11 Claims, 4 Drawing Sheets

GAS GENERATOR WITH IMPROVED SUPPORTED BURST CUP

CROSS-REFERENCE TO RELATED APPLICATION

This application is entitled to and claims the benefit of Provisional Patent Application Ser. No. 62/131,594, filed on Mar. 11, 2015.

BACKGROUND OF THE INVENTION

The present invention relates to gas sources used for activating gas-actuated devices and, more particularly, to a gas sources incorporating a releasable, pressurized, stored gas component sealed with a burst cup.

SUMMARY

As shown in the Figures and as described below, one embodiment of a pressurized gas mechanism in accordance with the present invention, contains: a vessel containing pressurized gas; a housing fixed to or adjacent to the vessel, the housing containing a bore portion defined by an inner wall, an interior, and a first end and a second end. The burst cup is sealably fixed, or fixed in a leakproof manner, at the first end of the housing, in fluid communication with the pressurized gas and retaining the pressurized gas. The burst cup includes: a flange portion radially extending adjacent to the bore portion; a stress riser web axially extending from the flange portion, the stress riser web radially supported by the bore portion; a flared portion extending radially inward from the stress riser web, a radially outward-most portion of the flared portion radially supported by the bore portion; and a closed reduced-diameter portion forming an interior of the burst cup. This embodiment further includes an igniter positioned within the housing to enable fluid communication with an interior of the housing, to release ignition products against the reduced-diameter portion upon igniter actuation. A plenum is defined between the inner wall of the housing and the reduced-diameter portion of the burst cup, wherein upon activation of the pressurized gas mechanism, the flared portion is biased against the inner wall in a cantilevered fashion as the igniter impinges against the reduced-diameter portion, thereby fracturing the stress riser web (or rupturable portion of the burst cup). A perforated diffuser is integral to the second end of the housing and in fluid communication with the housing interior upon actuation of the stored gas or pressurized gas mechanism Yet another embodiment of the invention may further be characterized as a pressurized gas mechanism containing: a vessel containing pressurized gas; a housing fixed to or adjacent to the vessel, the housing containing a bore portion defined by an inner wall, an interior, and a first end and a second end; and, a burst cup sealably fixed at the first end in fluid communication with the pressurized gas and retaining the pressurized gas until actuation of the pressurized gas mechanism. The burst cup includes: a flange portion radially extending adjacent to said bore portion; and a stress riser web axially extending from said flange portion, the stress riser web radially supported by the bore portion.

Yet another embodiment of the present invention may be characterized as a gas generator containing: a sealed gas container comprising a first opening; a housing circumferentially fixed about said sealed gas container proximate to a first end of said housing, the housing containing an inner chamber and at least one gas exit orifice at a second end of the housing, wherein the housing contains a lever portion of an inner wall. A burst cup is defined by an outer wall and fixed across the first opening such that the burst cup seals and fluidly communicates with the sealed gas container, the burst cup extending into the inner chamber of the housing. A rupturable portion of the burst cup is positioned radially inward and juxtaposed to or adjacent to the lever portion. An igniter may be actuated to provide forces against the outer wall of the burst cup thereby biasing the rupturable portion against the lever portion to unseal the sealed gas container and release gas into the inner chamber.

Finally, yet another embodiment may be characterized as a pressurized gas mechanism containing a sealed gas container containing a sealed first end; a burst cup sealing the first end and containing a rupturable portion; and a housing encasing the burst cup and at least a portion of the sealed gas container, the housing containing a surface juxtaposed to the rupturable portion. In accordance with the present invention, the rupturable portion is adapted to rupture as the rupturable portion is leveraged against the juxtaposed surface or a cornered edge of the surface, thereby releasing gas from the sealed gas container.

DETAILED DESCRIPTION

Figure 1:
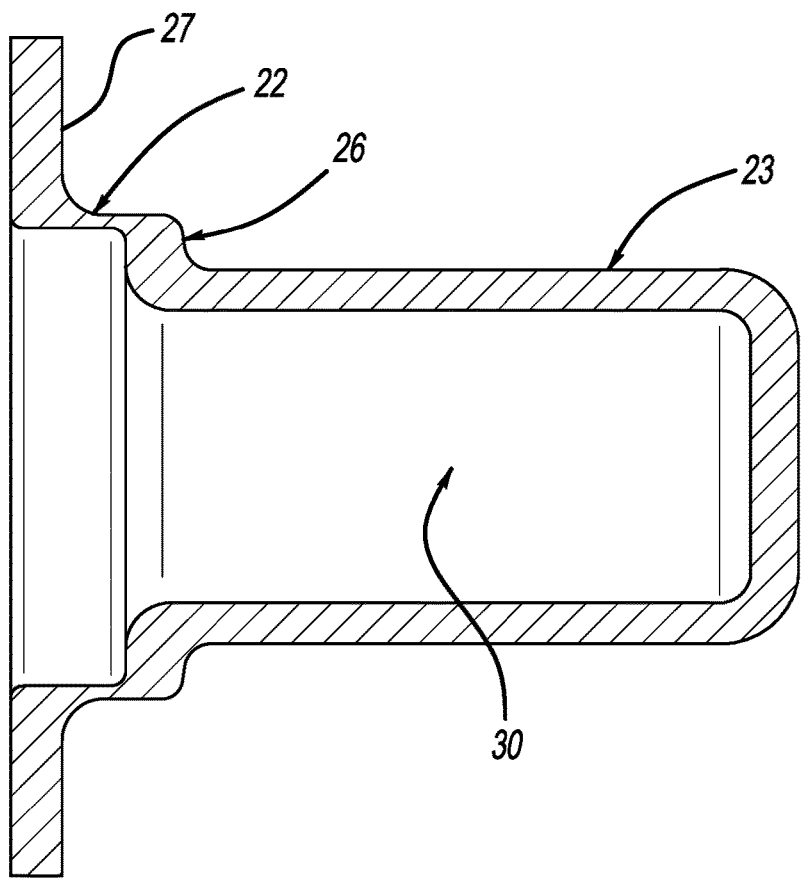
FIG. 1 is a cross-sectional side view of a sealing member or burst cup in accordance with an embodiment of the present invention.
Figure 2:
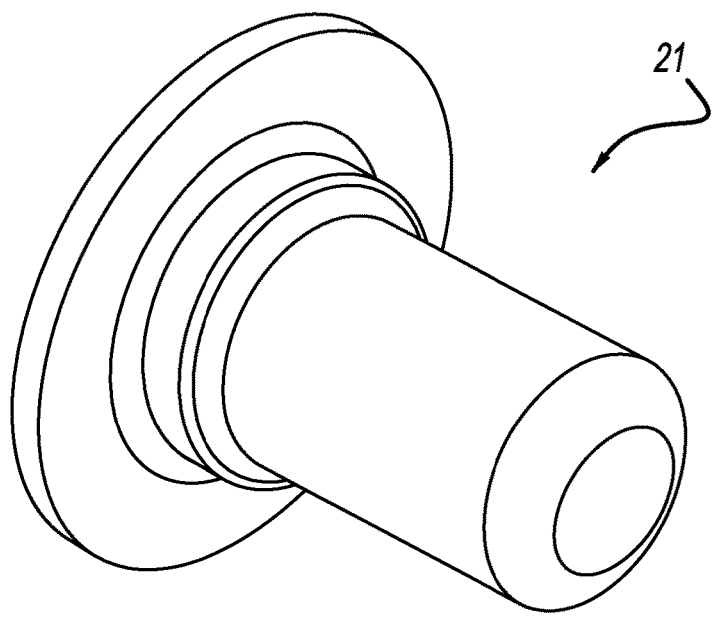
FIG. 2 is a perspective view of the burst cup of FIG. 1.

Similar reference characters denote similar features consistently throughout the attached drawings. In addition, different embodiments of mechanism 10, apparatus 11, and their constituent elements (described below) may be denoted by an appropriate suffix applied to the element or embodiment in associated drawing figures.

Figure 3:
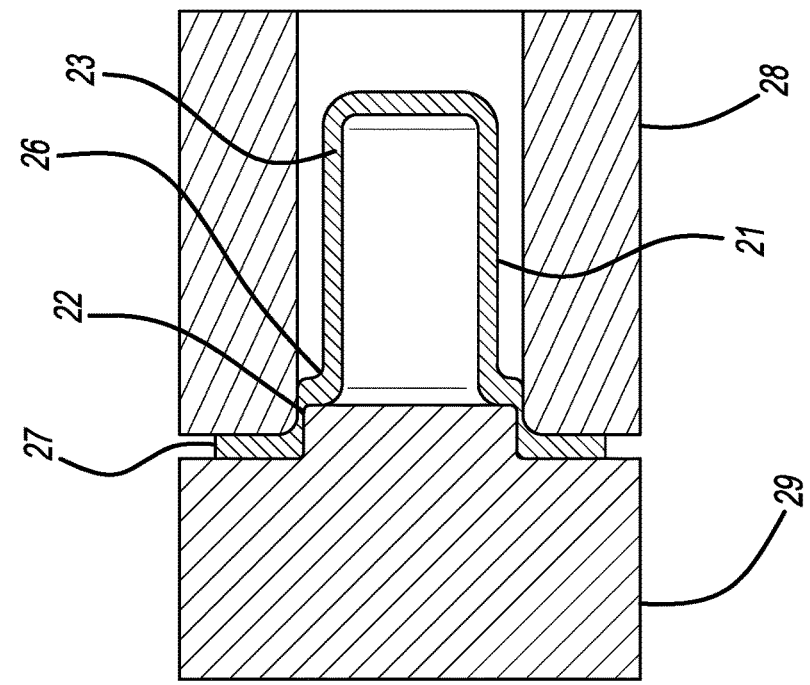
FIG. 3 is a cross-sectional side view of the process of forming the burst cup of FIG. 1.
Figure 3:
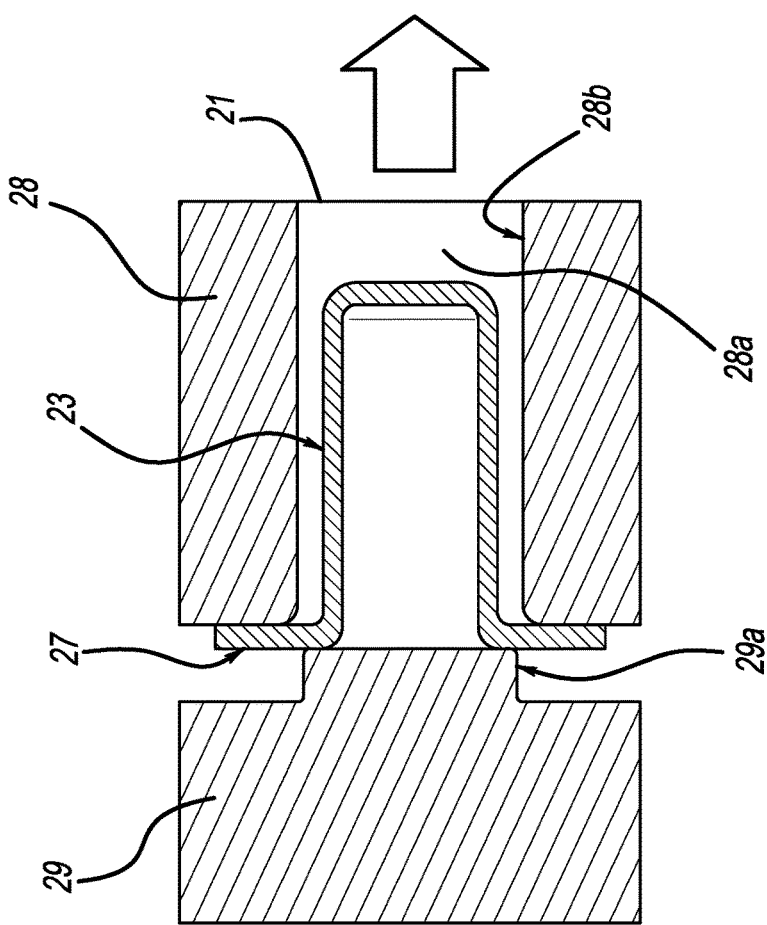
Figure 4:
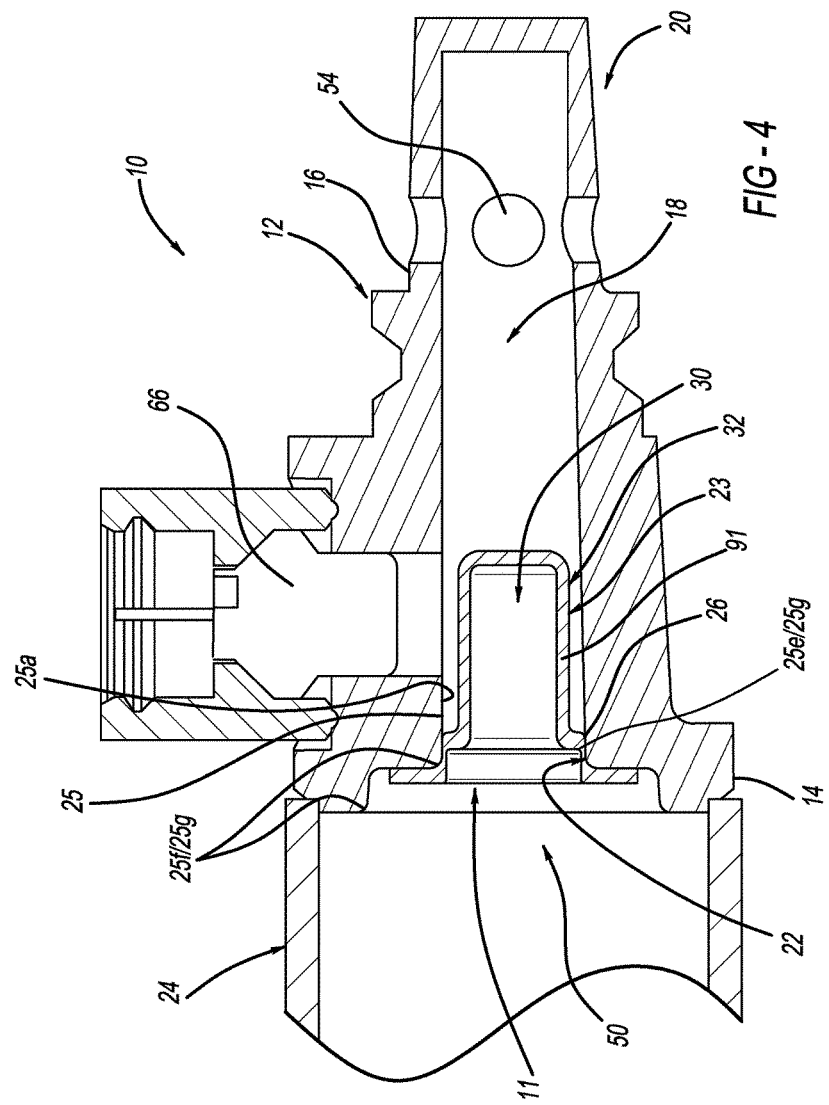
FIG. 4 is a cross-sectional side view of a gas release mechanism for releasably blocking a flow of pressurized fluid from a container in accordance with another embodiment of the present invention, wherein the burst cup of FIG. 1 is installed within the mechanism or gas release mechanism.

FIGS. 1-4 show an exemplary embodiment of a mechanism 10 for releasably blocking a flow of pressurized fluid from a container, in accordance with the present invention. In FIG. 4, mechanism 10 is shown operatively coupled to a container or bottle 24 for storing a pressurized fluid therein. However, an embodiment of the mechanism may alternatively be operatively coupled to any device from which a pressurized fluid is designed to flow, to releasably block the flow of pressurized fluid. As used herein, the term "releasably blocking" denotes that the apparatus normally blocks flow of the pressurized fluid, but that the portion of the apparatus blocking the fluid flow may be deactivated to release the fluid under certain conditions (for example, by activation of an igniter 66 following activation of a gas generating system into which the apparatus is incorporated, as described herein). In combination, mechanism 10 and container 24 may form a gas source for supplying gas to a gas-actuatable device, for example, an inflatable cushion or inflatable element (not shown) in a vehicle occupant protection system. Alternatively, mechanism 10 and container 24 may form a stored gas component incorporated into a gas generating system (for example, a hybrid gas generating system or a hybrid inflator) including a combustible gas generant material.

Referring to the drawings, embodiments of mechanism 10 include an associated housing 12 adapted for receiving the flow of fluid therethrough, and an associated apparatus 11 for blocking the flow of fluid through the housing. Each embodiment of apparatus 11 includes an associated seal member or burst cup 21 having a stress riser web or rupturable portion 22 formed therealong. In the embodiments shown in the drawings, housing 12 has a first end 14, a second end 16 opposite the first end, and a fluid flow passage or inner chamber 18 extending between ends 14 and 16.

In further accordance with the present invention, a reduced diameter section 23 is formed in the shape of a cup and is radially fully supported at a flared portion 26 adjacent the stress riser web 22. As shown in FIG. 4, the stress riser web 22 is surrounded by an inner wall 25a of the housing 12, thereby defining a housing bore 25, and thereby providing complete radial support about the periphery of the stress riser web 22. An aft portion 25e of the inner wall 25a, alone or in combination with a corner portion 25f of the housing 12, forms a lever portion 25g.

The stress riser web or rupturable portion 22 of the burst cup 21 is positioned radially inward and juxtaposed to or adjacent to the lever portion 25g. As explained herein, an igniter may be actuated to provide forces against the outer wall of the burst cup 21 thereby biasing the rupturable portion 22 against the lever portion 25g to unseal the sealed gas container 24 and release gas into the inner chamber 18 of the housing 12.

As also shown in FIG. 4, the flared portion 26 extends radially inwardly from the stress riser web 22 to connect with the axially extending reduced diameter section or portion 23. As a result, a plenum 32 is radially formed about reduced-diameter section 23, thereby providing a clearance for cantilevered fracture of the stress riser web 22 when mechanism 10 is actuated. Stated another way, the plenum 32 is formed between the inner wall 25a of the housing bore 25 and the reduced-diameter section 23.

Referring to the drawings, housing 12 includes a hollow diffuser 20 machined or otherwise formed therein, for distributing gases from housing 12 to an airbag or other gas-actuatable device. In an alternative embodiment, diffuser 20 is separately formed from steel or other suitable materials and then welded or otherwise fixed to housing second end 16.

Seal member or burst cup 21 is in fluid communication with an interior 50 of bottle 24 and is exposed to pressurized fluid contained in the bottle. Burst cup or seal member 21 is adhered, welded or otherwise affixed to housing 12 or another element of the gas source proximate an opening of bottle 24 to form a fluid-tight barrier preventing flow of pressurized gas through or around the seal member. Burst cup 21 may be cup-shaped as shown in FIGS. 1-4, or the seal member or burst cup 21 may have any of a variety of other configurations as known in the art, so long as the features of the burst cup 21 remain oriented as described above.

Each embodiment of the burst cup or seal member 21 described herein incorporates a rupturable portion or stress riser web, generally designated 22, formed thereon. Upon actuation of the mechanism 10, the stress-riser 22 defines a thinned region along which the cup 21 ruptures upon contact of gas, heat, and forces released from igniter 66, thereby releasing the pressurized gas from the bottle. As used herein, the term "rupturable portion" is understood to refer to a portion of the burst cup or seal member that is designed to rupture under predetermined conditions, in contrast to remaining portions of the seal member which are designed to remain intact during rupture of the rupturable portion.

In general, the rupturable portion will have a reduced cross-sectional area or other stress-riser designed in and formed therealong to facilitate rupture at a desired location on the seal member. As used herein, the "rupturable portion" of the seal member is also understood to encompass any portion of the seal including a reduced cross-sectional area or other stress-riser.

The embodiment of burst cup or seal member 21, as shown in FIG. 3, may be cold-worked, deep drawn, extruded, or otherwise formed from a metallic, polymeric, or other material into which the desired stress-riser may be formed and which possesses the strength necessary to resist the forces exerted on the member by the compressed gas stored in bottle 24 prior to activation of the gas source. As shown in FIG. 3, a metallic burst cup 21 is initially provided with a flange 27 and a reduced diameter portion 23. The un-deformed burst cup 21 is then worked into a mold 28 as a die or block 29 is pushed or biased against the burst cup 21 into a cavity 28a formed within the mold 28. As also shown in FIG. 3, the stress riser web 22 is thereby formed by the impingement of the flange 27 between a first portion 29a of the block 29 and an inner wall 28b of the mold 28. Upon completion of the deep drawn process illustrated in FIG. 3, the burst cup 21 is mechanically deformed with the features stated above.

The materials and structural details of the burst cup or seal member will depend on such factors as the pressure of the gas sealed in bottle 24, the desired configuration of the stress-riser, and the desired performance characteristics of a gas source into which mechanism 10 is incorporated. For example, burst cups made from materials and/or having structures which are more or less readily ruptured may be used.

A device capable of generating at least a predetermined minimum force suitable for rupturing seal member or burst cup 21 is mounted to the housing so as to permit fluid communication with the seal member or burst cup 21 upon activation of the gas source. Suitable force-generating devices include explosively actuated projectiles or pin pokers, and any devices capable of supplying a gas jet or shock front, for example initiators, gas generators and detonators. In the embodiments shown in the drawings, a known initiator or squib 66 is crimped or otherwise suitably secured to a periphery of housing 12 and extends through a wall of the housing so that, upon activation of the initiator 66, fluid communication between the reduced-diameter section 23 of the burst cup 21 and the initiator 66 is enabled. One exemplary initiator construction is described in U.S. Pat. No. 6,009,809, herein incorporated by reference.

Prior to activation of the gas source, burst cup or seal member 21 is in fluid communication with and under pressure from the pressurized fluid 16 stored in bottle 24. The burst cup 21 is configured and dimensioned such that exposure to pressure differentials resulting from activation of the gas source and any associated mechanism such as initiator 66 ensures a timely burst cup rupture in order to produce rupturing of the burst cup and release of the stored gas.

In some applications, it is also desirable to configure and dimension the seal member so as to ensure rupture of the seal member upon occurrence of a predetermined minimum elevated temperature condition in the stored gas. That is, it may be desirable to ensure that the seal member 21 will rupture, or is adapted to rupture, when or after (but not before) the gas stored in the bottle 24 reaches a predetermined elevated temperature. In one particular example, the predetermined elevated temperature is 130° C. This threshold elevated temperature effectively defines an associated rupture pressure for the seal member, for a given seal member design, fluid composition, and fluid density. This ensures venting of the stored gas from the bottle 24 at or near the desired rupture pressure when the gas bottle is exposed to elevated external temperatures.

At elevated gas pressures resulting from elevated bottle temperatures, the seal member or burst cup at the stress riser may stretch and thin. If the material at the stress riser as fabricated is already relatively thin, further stretching of the material due to elevated pressure may reduce the material thickness to the point where the pressure at which the seal member will rupture is effectively lowered. This may cause the seal member to rupture prematurely, before the temperature corresponding to the desired burst pressure has been reached. As stated herein, the design of the present gas generator ensures a relatively thin stress riser, as compared to prior designs, while yet ensuring that the seal member does not rupture prematurely.

More specifically, stress riser stretching and thinning is accounted for in the design of the burst cup. In accordance with the present invention, radial deformation or thinning of the stress riser is mitigated or substantially reduced, thereby maximizing the benefit of reduced web thickness and operational robustness.

In other prior similar devices, radial stretching increases the thinning and raises the stresses in the stress riser over and above axial stretching alone. Accordingly, a greater material thickness of the stress riser is required to achieve substantially equal strength at the desired rupture pressure. At any pressure below the elevated temperature burst pressure, similar devices having an increased web thickness required for a radially deforming web necessarily increases the strength of the stress riser, thus increasing the side force on the reduced diameter section required to induce failure.

Accordingly, it is an object of this invention to reduce the material thickness of the stress riser to optimize the force needed to induce failure while yet not detracting from the overall robustness of the device.

In sum, as the gas pressure inside the bottle exceeds the pressure outside of the bottle, the stress riser area will stretch and thin. If stress riser is supported radially, in accordance with the present invention, the stretching is limited to the axial direction. If stress riser is not supported radially, stretching occurs radially and axially.

Also, the term "elevated pressure" as used herein refers to a pressure that is higher than a pressure of the stored fluid when the temperature of the vessel containing the fluid is within a normal operating temperature range prescribed for the vessel in its particular application.

It has been discovered that providing a housing bore 25 or support structure adjacent and/or along the rupturable portion 22 of the seal member 21 substantially prevents radially outward bulging of the rupturable portion or stress riser web 22 due to pressurization of the burst cup or seal member 21.

Normal operation of the embodiment shown in FIGS. 1-4 is as follows. Upon occurrence of a crash event, the igniter 66 is activated by a signal received from a crash sensor or accelerometer (not shown). When the igniter is fired, the interior of housing 12 is pressurized. Pressure generated by activation of the initiator acts on burst cup 21, applying a load on the burst cup 21 which induces an axial tensile load in the burst cup wall 91. The combination of the stress induced by the bottle gas pressure and the stress induced by the load on the burst cup or seal member 21 exceeds the break strength of the thinner stress riser web or rupturable portion 22 of the burst cup 21. The burst cup thereby ruptures along the rupturable portion 22, thereby releasing the gas. Stored pressurized fluid within bottle 24 then flows through the ruptured burst cup and through housing 12, into diffuser 20, and out of the diffuser through orifices 54 and into an airbag or other inflatable element (not shown). A filter (not shown) may be positioned in diffuser 20 to trap by-products of initiator activation, portions of the seal member, or other debris within the diffuser to prevent their entry into the airbag. It will be appreciated that the initiator or igniter 66 may alternatively be characterized as a force-producing device that provides a force substantially orthogonal to the reduced-diameter portion 23.

In the embodiments shown in FIGS. 1-4, the wall thickness of the rupturable portion or stress riser web 22 affects the pressure at which the seal member or burst cup will burst. The burst strength of the rupturable portion or stress riser web is greater than the stress induced by the compressed gas in the bottle, but lower than the combined stress produced by the compressed gas and the forces on the burst cup/seal member resulting from activation of the igniter. The breaking strength of the stress riser web/rupturable portion is also less than the pressure inside the bottle needed to rupture the bottle. This provides a safe gas relief mechanism for over-pressurization situations caused by, for example, a fire external to the gas bottle.

Figure 5:
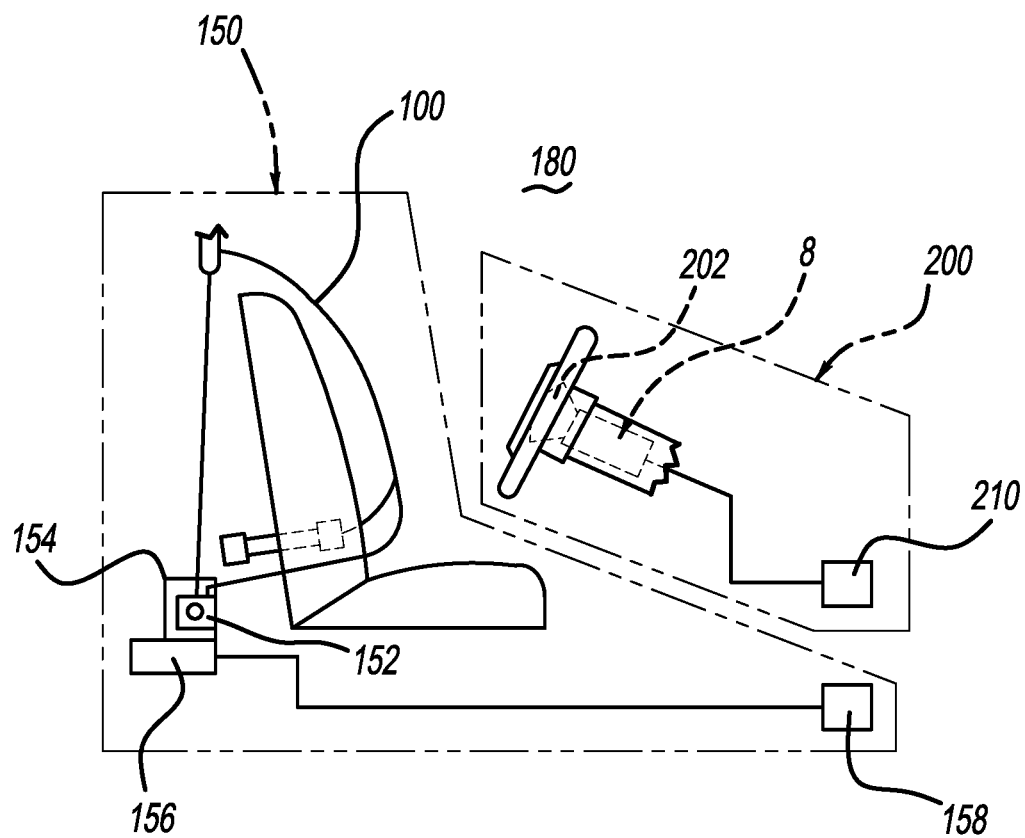
FIG. 5 is a schematic representation of an exemplary vehicle occupant protection system incorporating a gas source in accordance with the present invention.

Referring to FIG. 5, a gas source or gas generating system 8 including an embodiment of the sealing apparatus 10 described herein may be incorporated into an airbag system 200. Airbag system 200 includes at least one airbag 202 and a gas source 8 coupled to airbag 202 so as to enable fluid communication with an interior of the airbag. Airbag system 200 may also incorporate (or be in communication with) a crash event sensor 210 including a known crash sensor algorithm that signals actuation of airbag system 200 via, for example, activation of igniter 66 in the event of a collision.

Referring again to FIG. 5, a gas source or gas generating system including an embodiment of the sealing apparatus 10 described herein may be incorporated into a broader, more comprehensive vehicle occupant restraint system 180 including additional elements such as a safety belt assembly 150, as seen in FIG. 5. Safety belt assembly 150 includes a safety belt housing 152 and a safety belt 100 in accordance with the present invention extending from housing 152. A safety belt retractor mechanism 154 (for example, a spring-loaded mechanism) may be coupled to an end portion of the belt 100. In addition, a safety belt pretensioner 156 may be coupled to belt retractor mechanism 154 to actuate the retractor mechanism in the event of a collision. Typical seat belt retractor mechanisms which may be used in conjunction with the safety belt embodiments of the present invention are described in U.S. Pat. Nos. 5,743,480, 5,553,803, 5,667, 161, 5,451,008, 4,558,832 and 4,597,546, incorporated herein by reference. Illustrative examples of typical pretensioners with which the safety belt embodiments of the present invention may be combined are described in U.S. Pat. Nos. 6,505,790 and 6,419,177, incorporated herein by reference.

Safety belt system 150 may incorporate (or be in communication with) a crash event sensor 158 (for example, an inertia sensor or an accelerometer) including a known crash sensor algorithm that signals actuation of belt pretensioner 156 via, for example, activation of a pyrotechnic igniter (not shown) incorporated into the pretensioner. U.S. Pat. Nos. 6,505,790 and 6,419,177, previously incorporated herein by reference, provide illustrative examples of pretensioners actuated in such a manner.

It will be understood that the foregoing description of the present invention is for illustrative purposes only, and that the various structural and operational features herein disclosed are susceptible to a number of modifications, none of which departs from the scope of the present invention. The preceding description, therefore, is not meant to limit the scope of the invention, but is meant to include any equivalents that would be realized by those of ordinary skill in the art.

What is claimed is:

1. A gas generator comprising:
   a sealed gas container comprising a first opening;
   a housing having a first end, the housing being circumferentially fixed about said first opening of the sealed gas container proximate to the first end of said housing, said housing defining an inner chamber and at least one gas exit orifice at a second end of said housing, said housing defining a lever portion of an inner wall;
   a burst cup having an outer wall and being fixed across said first opening of the sealed gas container such that said burst cup seals and fluidly communicates with said sealed gas container, the burst cup extending into said inner chamber;
   a portion of the outer wall of the burst cup defining a rupturable portion, said rupturable portion being disposed radially inward and in contact with said lever portion; and
   an igniter that when actuated provides forces against said outer wall of said burst cup thereby biasing said rupturable portion away from said lever portion to break the rupturable portion, which unseals the sealed gas container and releases gas into said inner chamber.

2. The gas generator of claim 1 wherein said lever portion comprises an aft portion of said inner wall.

3. The gas generator of claim 1 wherein said lever portion comprises a corner portion of said housing, said corner portion including said inner wall.

4. The gas generator of claim 1 wherein said lever portion comprises an aft portion of said inner wall and a corner portion of said housing.

5. The gas generator of claim 1 wherein a flared portion of said burst cup extends radially inward from the rupturable portion.

6. A pressurized gas mechanism comprising:
   a sealed gas container containing a sealed first end;
   a burst cup sealing said first end and containing a rupturable portion; and
   a housing encasing said burst cup and juxtaposed to at least a portion of said sealed gas container, said housing containing a surface in contact with said rupturable portion,
   wherein said rupturable portion is adapted to rupture as the rupturable portion is leveraged away from said surface, thereby releasing gas from said sealed gas container.

7. The pressurized gas mechanism of claim 6 wherein said surface is an inner wall of said housing.

8. The pressurized gas mechanism of claim 6 wherein said surface contains a cornered portion of said housing.

9. The pressurized gas mechanism of claim 6 wherein said surface contains an inner wall of said housing.

10. A pressurized gas mechanism containing:
    a vessel containing pressurized gas;
    a housing fixed to or adjacent to the vessel, the housing containing a bore portion defined by an inner wall, an interior, and a first end and a second end;
    a burst cup sealably fixed at the first end in fluid communication with the pressurized gas and retaining the pressurized gas, the burst cup including:
       (a) a flange portion radially outwardly extending adjacent to the bore portion;
       (b) a stress riser web axially extending from the flange portion, the stress riser web radially supported by the bore portion;
       (c) a flared portion extending radially inward from the stress riser web, a radially outward-most portion of the flared portion radially supported by the bore portion;
       (d) a closed reduced-diameter portion forming an interior of the burst cup; and
    an igniter positioned within the housing to enable fluid communication with an interior of the housing, to release ignition products against the reduced-diameter portion.

11. The pressurized gas mechanism of claim 10 further comprising:
    a plenum defined between the inner wall and reduced-diameter portion, wherein upon activation of the pressurized gas mechanism, the flared portion is biased against the inner wall as the igniter products impinge against the reduced-diameter portion, thereby fracturing the stress riser web; and
    a perforated diffuser in fluid communication with the housing interior.

* * * * *